United States Patent
Al-Hashmy et al.

(10) Patent No.: US 12,072,057 B2
(45) Date of Patent: Aug. 27, 2024

(54) FABRIC JACKET TO PREVENT NONMETALLIC EQUIPMENT FROM EXTREME HEAT, EXTERNAL DAMAGE AND FIRE

(71) Applicant: Saudi Arabian Oil Company, Dhahran (SA)

(72) Inventors: Hasan Ali Al-Hashmy, Dhahran (SA); Christian Canto Maya, Dhahran (SA); Yassine MalaJati, Beachwood, OH (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 18/161,254

(22) Filed: Jan. 30, 2023

(65) Prior Publication Data
US 2023/0175634 A1    Jun. 8, 2023

Related U.S. Application Data

(63) Continuation of application No. 17/155,971, filed on Jan. 22, 2021, now Pat. No. 11,566,746.

(51) Int. Cl.
*F16L 59/02* (2006.01)
*B32B 3/12* (2006.01)
(Continued)

(52) U.S. Cl.
CPC ........... *F16L 59/029* (2013.01); *F16L 59/021* (2013.01); *F16L 59/145* (2013.01); *B32B 3/12* (2013.01);
(Continued)

(58) Field of Classification Search
CPC ..... F16L 59/029; F16L 59/021; F16L 59/145; B32B 7/09; B32B 3/12; B32B 5/06;
(Continued)

(56) References Cited

U.S. PATENT DOCUMENTS

| | | |
|---|---|---|
| 2,744,042 A | 5/1956 | Pace |
| 4,495,235 A | 1/1985 | Tesch |

(Continued)

FOREIGN PATENT DOCUMENTS

| | | |
|---|---|---|
| EP | 2393970 B1 | 11/2017 |
| JP | 2016102313 A | 6/2016 |

(Continued)

OTHER PUBLICATIONS

Zmij, Polymer-cement based concrete—review of properties and possibility of application in structural members, ICEUBI2017 International Congress on Engineering 2017, Portugal.
(Continued)

*Primary Examiner* — David R Deal
(74) *Attorney, Agent, or Firm* — Leason Ellis LLP

(57) ABSTRACT

A protective fabric jacket for placement on an object to be protected from excessive heat includes a first layer; a second layer; and an intermediate spacer fabric layer that is disposed between the first layer and the second layer. The first and second layers are attached to the intermediate spacer fabric layer to form a layered structure. The intermediate spacer fabric layer comprises a flexible honeycomb or octagonal shaped spacer fabric that has a plurality of cells defined therein. The protective fabric jacket also includes a settable material that disposed within the cells and includes a cementitious mixture and one or more organic polymers and is settable to a hardened material.

20 Claims, 6 Drawing Sheets

(51) Int. Cl.
*B32B 7/09* (2019.01)
*B32B 27/22* (2006.01)
*F16L 59/14* (2006.01)
*B32B 5/06* (2006.01)
*B32B 27/32* (2006.01)

(52) U.S. Cl.
CPC . *B32B 5/06* (2013.01); *B32B 7/09* (2019.01); *B32B 27/22* (2013.01); *B32B 27/322* (2013.01); *B32B 2262/0207* (2013.01); *B32B 2262/106* (2013.01); *B32B 2305/024* (2013.01); *B32B 2305/18* (2013.01); *B32B 2307/304* (2013.01); *B32B 2307/3065* (2013.01)

(58) Field of Classification Search
CPC ............. B32B 27/22; B32B 27/322; B32B 2262/0207; B32B 2262/106; B32B 2305/024; B32B 2305/18; B32B 2307/304; B32B 2307/3065
USPC ........................................................ 138/149
See application file for complete search history.

(56) References Cited

U.S. PATENT DOCUMENTS

| | | | |
|---|---|---|---|
| 8,287,982 B2 | 10/2012 | Brewin et al. | |
| 8,703,266 B2 | 4/2014 | Crawford et al. | |
| 10,435,859 B2 | 10/2019 | Krasnoff | |
| 11,566,746 B2 * | 1/2023 | Al-Hashmy | F16L 59/029 |
| 2004/0137193 A1 | 7/2004 | Wedi | |
| 2009/0158965 A1 | 6/2009 | Andersen | |
| 2011/0206920 A1 | 8/2011 | Ehsani | |
| 2012/0040161 A1 | 2/2012 | Weidinger | |
| 2012/0118589 A1 | 5/2012 | Quante | |
| 2012/0135202 A1 * | 5/2012 | Weidinger | B32B 27/322 |
| | | | 156/60 |
| 2016/0046396 A1 | 2/2016 | Pinney | |
| 2017/0203496 A1 | 7/2017 | Ehsani | |
| 2019/0256418 A1 | 8/2019 | Riley | |
| 2020/0376806 A1 | 12/2020 | Krasnoff | |
| 2021/0018136 A1 | 1/2021 | Vernhes | |
| 2021/0167438 A1 | 6/2021 | Evans | |
| 2021/0179506 A1 | 6/2021 | Teng | |

FOREIGN PATENT DOCUMENTS

| | | |
|---|---|---|
| KR | 101050297 A | 12/2010 |
| WO | 2017210068 A1 | 12/2017 |

OTHER PUBLICATIONS

Feng, A. F. "Properties of honeycomb polyester knitted fabrics." IOP Conference Series: Materials Science and Engineering. vol. 137. No. 1. IOP Publishing, 2016.

Elsanadedy, Hussein, et al. "Effect of high temperature on structural response of reinforced concrete circular columns strengthened with fiber reinforced polymer composites." Journal of Composite Materials 51.3 (2017): 333-355.

AO. Kaeding et al., ACI 548.3R-03 Polymer Modified Concrete; American Concrete Institute (ACI); Jun. 17, 2003; 40 pages.

Office Action in corresponding Saudi Arabian Application No. 122430889, dated May 31, 2023, 6 pages.

* cited by examiner

FABRIC JACKET TO PREVENT NONMETALLIC EQUIPMENT FROM EXTREME HEAT, EXTERNAL DAMAGE AND FIRE

CROSS-REFERENCE TO RELATED APPLICATION

This application is a continuation of, and claims priority from, U.S. patent application Ser. No. 17/155,971, titled FABRIC JACKET TO PREVENT NONMETALLIC EQUIPMENT FROM EXTREME HEAT, EXTERNAL DAMAGE AND FIRE, filed on Jan. 22, 2021, which is hereby incorporated by reference in its entirety.

TECHNICAL FIELD

The present disclosure is directed to products for protecting heat sensitive equipment or another object and more particularly, to a spacer fabric jacket that is configured to be wrapped or otherwise disposed about the heat sensitive equipment or other object for protecting them from external damage originating from excessive heat as by a fire.

BACKGROUND

In different industries, many different pieces of equipment are used in many different environments, many of which can be harsh. Exemplary industries include but are not limited to oil and gas, building, marine, military, nuclear, etc. The equipment can be formed of many different types of material, including but not limited to composite materials (non-metallic) and metals. One of the threats to the equipment is in the form of excessive heat and fire that can easily damage the equipment.

Extreme heat is thus a common threat in facility operations and can lead to loss of containment if the materials exposed to it have poor heat resistance. If non-metallic materials are exposed to either extreme temperatures or fire can ignite their polymer matrix. This scenario could lead to a loss of containment which could make the fire emergency more difficult to control, besides to create a toxic smog from the polymer combustion.

Moreover, when non-metallic materials are exposed to extreme temperatures, above their glass transition temperature of their polymer matrix, their strength and stiffness get significantly reduced. This can lead to failure of the materials over time.

Certain techniques are used to protect the equipment from such external damage originating from excessive heat as by a fire. For example, protective jackets and wraps can be used to protect such equipment. While these products provide some protection, there is a need for an improved wrap or jacket for placement about the equipment for protection thereof.

SUMMARY

In one implementation, a protective fabric jacket for placement on an object to be protected from excessive heat includes a first layer; a second layer; and an intermediate spacer fabric layer that is disposed between the first layer and the second layer. The first and second layers are attached to the intermediate spacer fabric layer to form a layered structure. The intermediate spacer fabric layer comprises a flexible honeycomb or octagonal shaped spacer fabric that has a plurality of cells defined therein. The protective fabric jacket also includes a settable material that disposed within the cells and includes a cementitious mixture and one or more organic polymers and is settable to a hardened material.

BRIEF DESCRIPTION OF THE DRAWING FIGURES

DETAILED DESCRIPTION OF CERTAIN EMBODIMENTS

Figure 3:
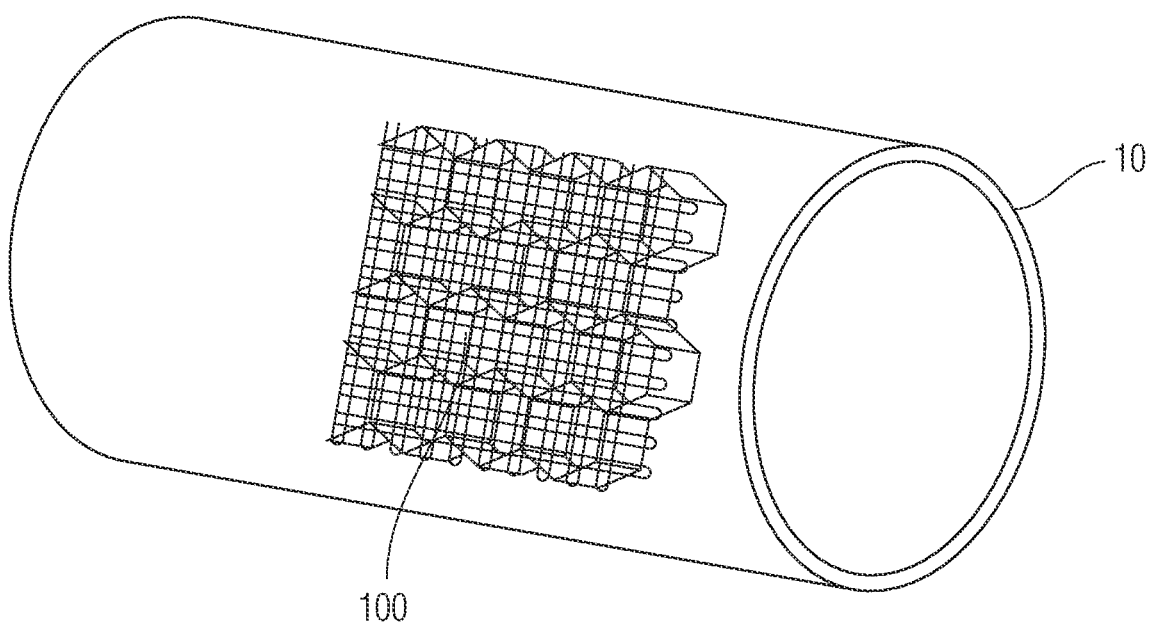
FIG. 3 is a side perspective view of a fabric jacket disposed about a pipe.

The present disclosure is directed to an improved fabric mat or jacket 100 that is configured for application on a piece of equipment or other heat sensitive object for providing heat shielding of the equipment or object. FIG. 3 shows one fabric jacket 100 that is disposed about a pipe 10 for protecting and shielding the pipe 10. It will be appreciated that the pipe 10 is only exemplary for one application and instead of installation on the pipe 10, the fabric jacket 100 can be installed on a piece of equipment.

FIGS. 1-7 show various details and the construction of the fabric jacket 100. In general, the fabric jacket 100 includes a bottom layer 110, a spacer fabric layer 200, and a top layer 120. In one exemplary embodiment, as described in more detail herein, the fabric jacket 100 forms a layered structure so as to form a sandwich type structure. As also described herein, the spacer fabric layer 200 is filled with a settable material that can be hardened to a rigid or semi-rigid solid to impart desired properties to the fabric jacket 100.

Bottom Layer 110

The function of the bottom layer 110 is, at least in part, to ensure that the settable material remains held within the cells (internal spaces) of the spacer fabric layer 200. The bottom layer 110 can take any number of different forms so long as the bottom layer 110 has a construction that prevents the settable material from migrating out of the cells of the spacer fabric layer 200. The bottom layer 110 thus partially restricts (blocks) and covers the bottom access openings into the cells. The bottom layer 110 can be in the form of a woven structure of a non-woven structure that is disposed along a bottom layer (bottom face) of the spacer fabric layer 200. The bottom layer 110 can be formed from any number of different materials including but not limited to synthetics (polymeric materials), etc. For example, the material for the bottom layer 110 can be natural or synthetic fibers, including but not limited to high strength and high modulus fibers, such as carbon fibers (PAN or pitch based), aramid fibers (e.g., Kevlar, Nomex, etc.), polyolefin fibers, such as ultra-high molecular weight polyethylene (UHMWPE), of glass fibers, ceramic fibers, etc. The selection can be in view of the intended application.

The bottom layer 110 can be attached to the spacer fabric layer 200 using any number of traditional techniques, including the use of bonding agents and/or the use of stitching in that the bottom layer 110 can be stitched to the spacer fabric layer 200. Stitching the bottom layer 110 to the spacer fabric layer 200 effectively joins the two structures.

As shown in the figures, the bottom layer 110 can have a net or screen-like construction. In other words, the bottom layer 110 can have a mesh construction. The mesh size is selected so that the settable material in its final hardened state is maintained within the spacer fabric layer 200 and is not permitted to fall through the mesh construction.

Top Layer 120

The function of the top layer 120 is, at least in part, to ensure that the settable material remains held within the cells of the spacer fabric layer 200. The top layer 120 can take any number of different forms so long as the top layer 120 has a construction that prevents the settable material from migrating out of the cells of the spacer fabric layer 200. The top layer 120 thus at least partially restricts (blocks) and covers the top access openings into the cells. The top layer 120 can be formed of the same material as the bottom layer 110 or the two can be formed of different materials. For example, the top layer 120 can be in the form of a woven structure of a non-woven structure that is disposed along a top layer (top face) of the spacer fabric layer 200. The top layer 120 can be formed from any number of different materials including but not limited to synthetics (polymeric materials), etc. For example, the material for the top layer 120 can be natural or synthetic fibers, including but not limited to high strength and high modulus fibers, such as carbon fibers (PAN or pitch based), aramid fibers (e.g., Kevlar, Nomex, etc.), polyolefin fibers, such as ultra-high molecular weight polyethylene (UHMWPE), of glass fibers, ceramic fibers, etc. The selection can be in view of the intended application.

It will be appreciated that the top layer 120 can be formed of the same material and/or have the same construction as the bottom layer 110 or it can be different.

The top layer 120 can be attached to the spacer fabric layer 200 using any number of traditional techniques, including the use of bonding agents and/or the use of stitching in that the top layer 120 can be stitched to the spacer fabric layer 200. Stitching the top layer 120 to the spacer fabric layer 200 effectively joins the two structures.

As shown in the figures, the top layer 120 can have a net or screen-like construction. In other words, the top layer 120 can have a mesh construction. The mesh size is selected so that the settable material in its final hardened state is maintained within the spacer fabric layer 200 and is not permitted to fall through the mesh construction.

Intermediate Spacer Fabric 200

The fabric jacket 100 can thus be a three layer structure with the spacer fabric 200 being the middle layer between the bottom layer 110 and the top layer 120. As described herein, the spacer fabric layer 200 is the functional layer in that, as described herein, the spacer fabric layer 200 contains functional material that is located within the spacer fabric for providing desired properties (material characteristics) to the overall fabric jacket 100.

As is known, spacer fabrics are a kind of 3D manufactured textile structures in which two outerfabric layers are connected by a layer of pile threads. Because of the layer of these spacer yarns, a defined distance can be established between the outer layers, which generally varies from 1.5 to 10 mm.

The intermediate spacer fabric 200 preferably takes the form of a flexible honeycomb shaped spacer fabric that is stitched in knit, mat, or plain woven fabric, including, but not limited to, stitching so as to form a 2D or 3D textile configuration. Any number of other stitching techniques (styles) can be used such as twill, sating, triaxle, uniaxial, etc. The flexible honeycomb spacer fabric 200 thus defines a plurality of cells 202 that represent the hollow interiors of the honeycomb wall structure. The shape (e.g., octagonal) of each cell 202 is determined by the shape of the wall structure that defines the cell 202.

The fiber used to form the flexible honeycomb spacer fabric can be a high thermal resistance material, such as carbon fiber, or a fire resistant material, such as aramid fibers known in the industry as Kevlar®. Other fibers that can be used to form the spacer fabric 200 include but are not limited to glass fibers, ceramic fibers, etc., based on the given application.

Figure 1:
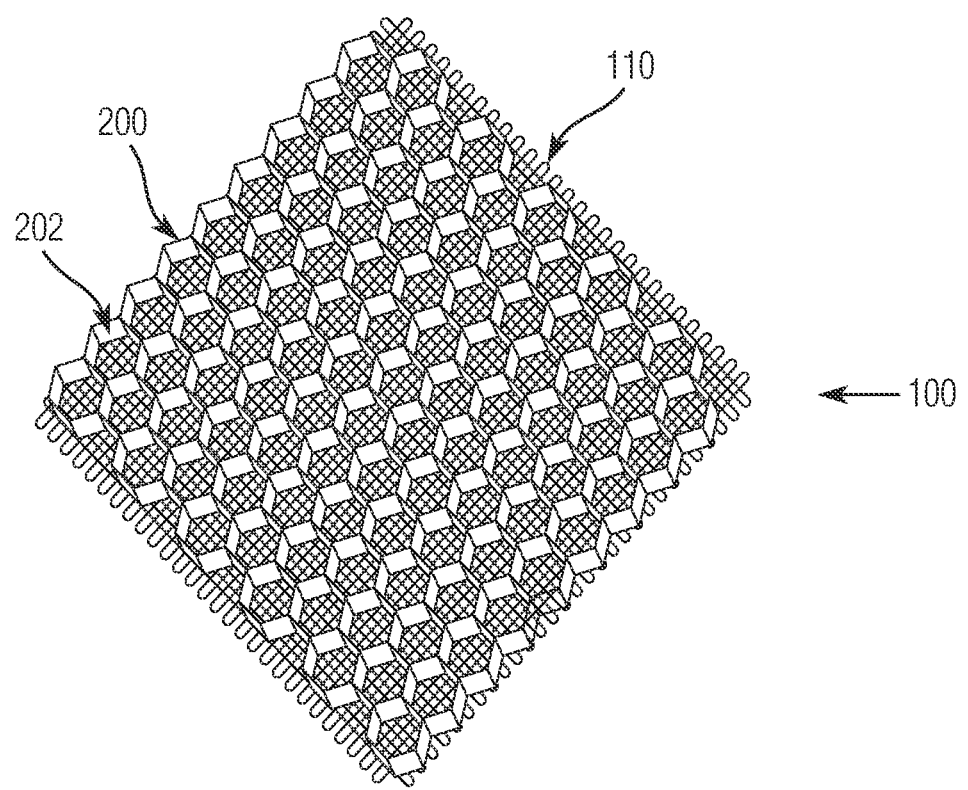
FIG. 1 is a top and side perspective view of a fabric jacket including a bottom layer and a spacer fabric layer.
Figure 2:
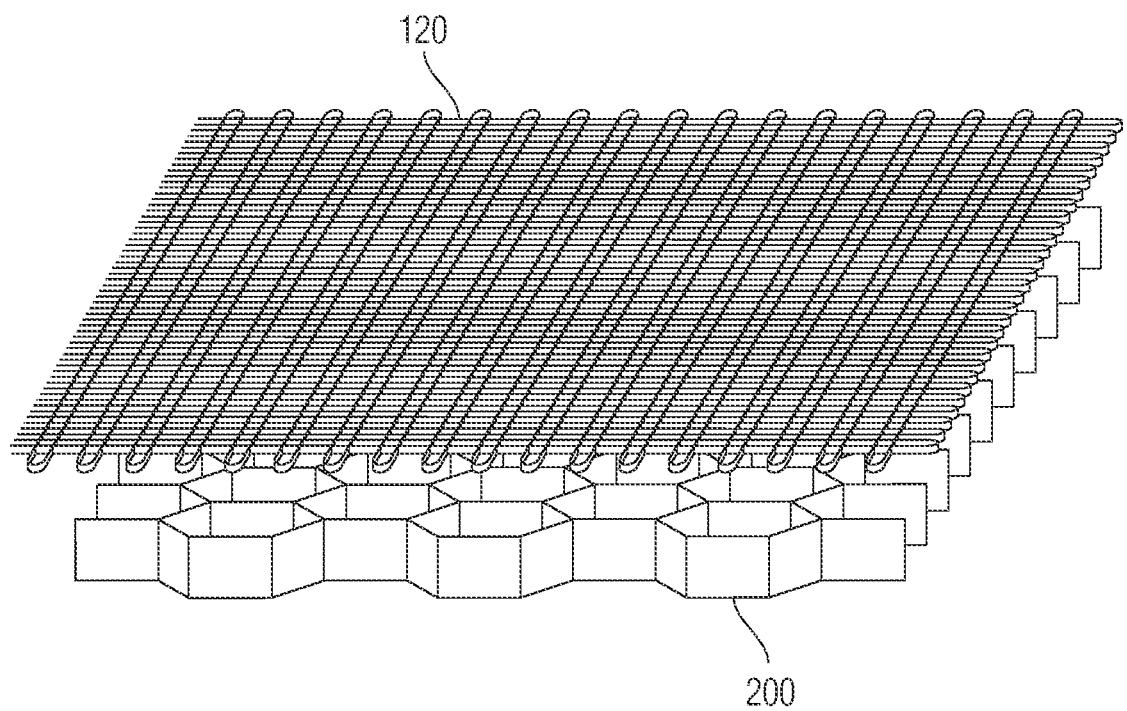
FIG. 2 is a top and side perspective view showing a top cover and the spacer fabric layer.

As shown in FIG. 1, the space (cells 202) within the honeycomb structure (the spacer fabric layer 200) is filled with the desired materials (e.g., settable material described below) during the preparation process then the top layer (cover) 120 is attached (e.g., stitched) to accommodate the filled materials as illustrated in FIG. 2. Since the desired materials are added into the cells 202 during the preparation process, the bottom layer 110 needs to be previously joined to the spacer fabric 200 prior to addition of these materials within the cells 202 so that the settable materials are held in the cells before attaching the top layer.

The arrangement of the honeycomb in-plan provides the required flexibility required to transport the final product (jacket 100) as well as to cover and wrap any equipment geometry. In other words, it has been discovered that the honeycomb shape permits the jacket 100 to readily flex and be wrapped or otherwise be disposed on different shaped surfaces while maintaining structural rigidity. It will be appreciated that the size of the honeycomb fabric 200 can vary depending upon on the application. The size of the honeycomb array in the figures has been exaggerated for the sake of clarity. The production of honeycomb flexible fabric can be produced in different dimensions (length/width) as it can be spooled easily as shown in FIG. 3. FIG. 3 shows one exemplary embodiment in which the fabric jacket 100 is wrapped about a cylindrical pipe 10.

It will be appreciated that the footprint of the bottom layer 110, the top layer 120 and the spacer fabric 200 is at least substantially the same for each layer so that the formed product is in the form of a sandwich (layered structure).

Octagonal Shaped

Figure 4:
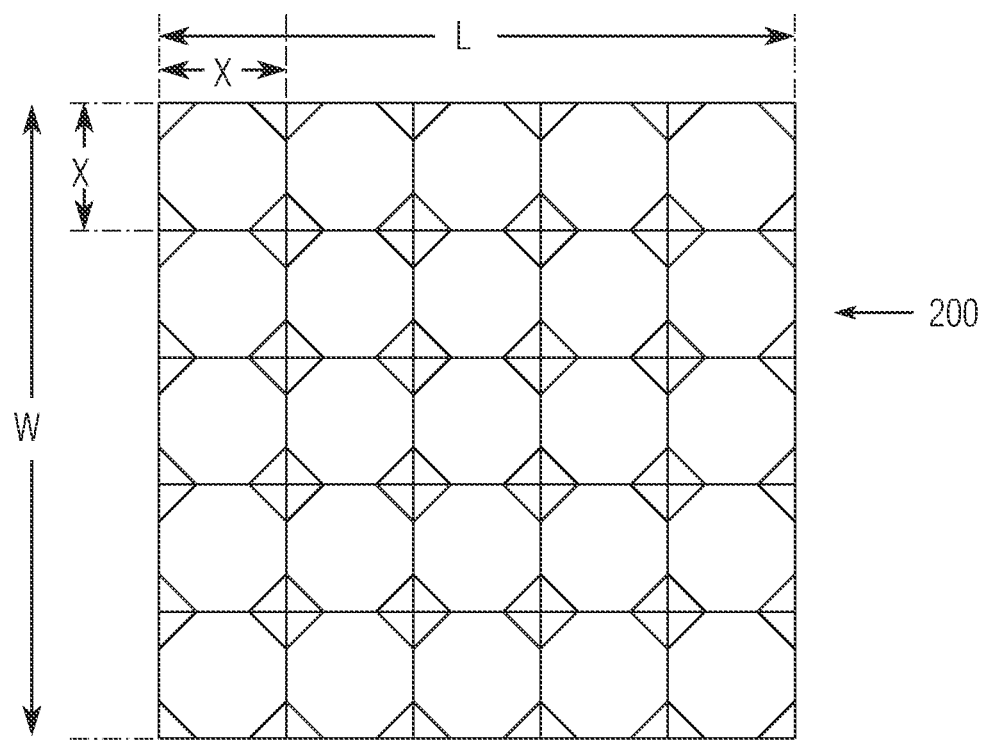
FIG. 4 is a top plan view of a spacer fabric layer shaped in 3D octagonal geometry.

As mentioned herein, the fabric jacket 100 that is preferably filled with settable materials can have an octagonal shape in that it is in the form of an octagonal shaped fabric. FIG. 4 is a top plan view of the mat or jacket structure shaped in a 3D octagonal geometry.

In this embodiment, the fabric jacket 100 can have a closed cell structure as opposed to the open cell structure that has been described and illustrated herein (e.g., FIG. 1). In FIG. 4, the closed cell structure can be in the form of octagonal shaped cubes. These closed cell structures are filled with the settable materials that are described herein much like how the spacer fabric 200 is filled.

As shown, the jacket 100 is formed of an array of octagonal shaped cells and in one embodiment, the x dimension (length) and width (L&W) for each octagon structure are equivalent. A 3D octagon can be stitched side-by-side with another 3D octagon together to form the sheet of fabric mat which can be described as being an octagonal sheet fabric mat (OSHM). The length of the sheet, represented in FIG. 4 as L, is the length of the sheet and can be variable depending on the length that is required to install underneath the pipe 10 (FIG. 3) or on top of the pipe 10. The width of the sheet, represented in FIG. 4 as W, can vary depending on the width of the geometry that is required for the given application.

In both the open cell embodiment of FIG. 1 and the closed cell embodiment of FIG. 4, the fabric mat is closed off with the bottom layer 110 and the top layer 120. In other words, the closed cell octagonal shaped fabric is covered on an upper surface with the top layer 120 and is covered on the lower surface with the bottom layer 110.

Figure 5:
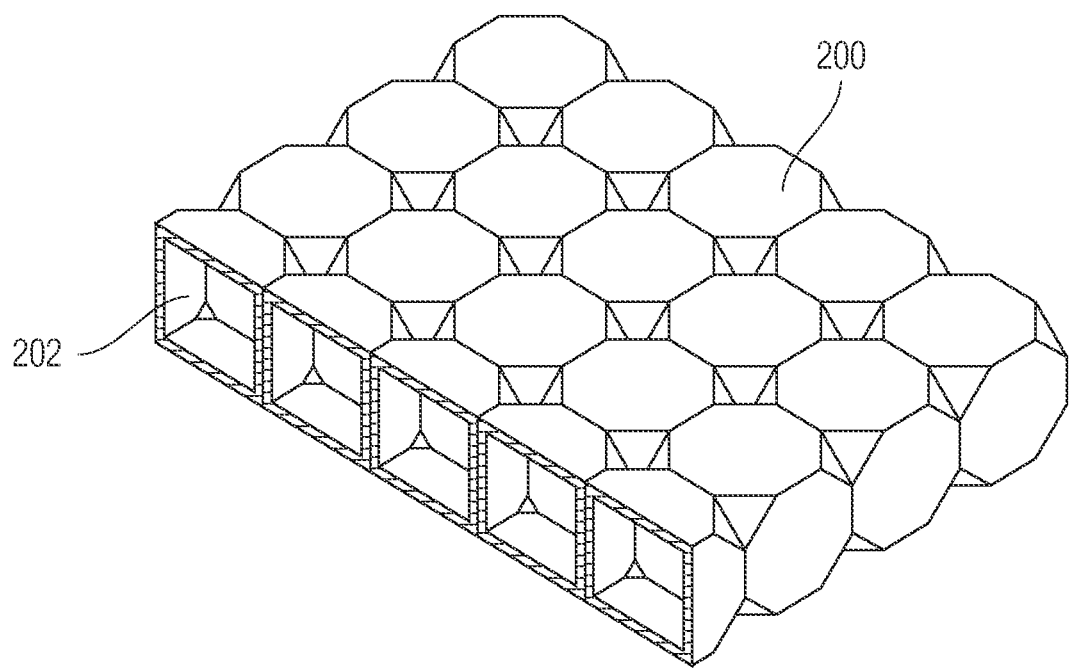
FIG. 5 is a side and top perspective view of the spacer fabric layer shown in partial cross-section.
Figure 6:
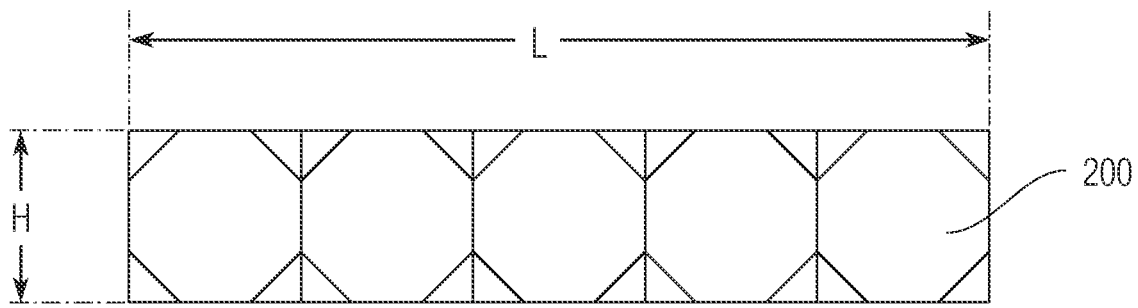
FIG. 6 is a side elevation view thereof.
Figure 7:
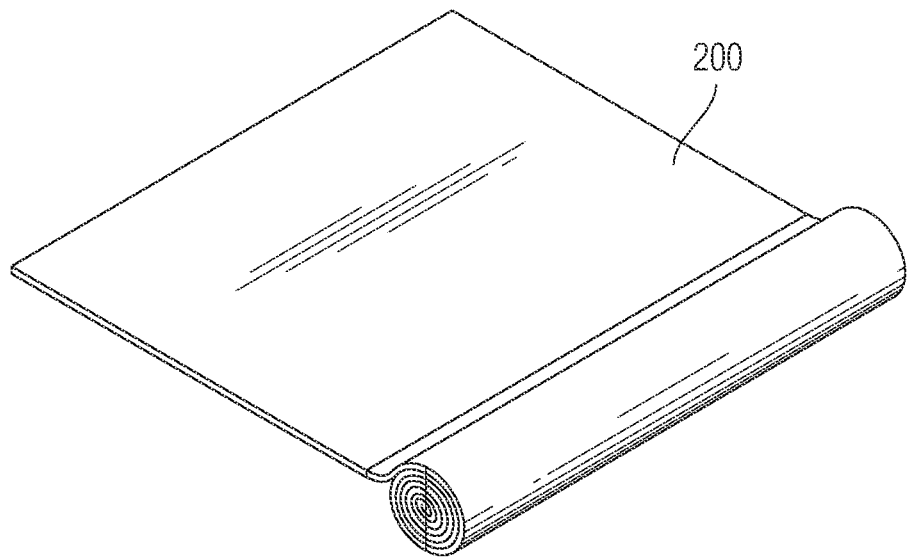
FIG. 7 is a perspective view of a roll of the spacer fabric layer.

FIG. 6 shows the side view in which the height is represented by H. FIG. 5 shows the 3D octagonal sheet fabric mat (OSHM) with the top and bottom layers removed for sake of clarity. The formation of the 3D octagonal sheet fabric mat (OSHM) is flexible which allows it to be wrapped during a handling process as can be seen in FIG. 7 (for simplicity, the top and bottom layers have been eliminated; however even with these layers, the mat or jacket 100 can be rolled as shown in FIG. 7). The formation of the 3D octagonal sheet fabric mat (OSHM) can be easily doubled in size by stacking a formation of sheet on top of each other and stitched together. Moreover, it can be tripled in size which depends on the intended application for the mat/jacket 100.

Settable Material

The flexible honeycomb spacer fabric 200 can be and is preferably filled with one or more settable materials which can provide the desired equipment a guard required to prevent them from external thermal effect, external damage (third-party) and external fire incidence. In other words, the settable materials impart desired properties to the spacer fabric 200 by being filled within the cells 202. The flexible honeycomb spacer fabric 200 provides the flexibility required to wrap and cover the desired equipment or object, such as a pipe, tank, etc. At the same time, the flexible honeycomb spacer fabric 200 contains and holds the settable materials filled therein within the cells 202.

The cells 202 of the spacer fabric 200 are filled with a settable material that can be hardened being to a rigid or semi-rigid solid on the addition of a setting agent, such as water or a waterborne solution, or on carbonation reactions with carbon dioxide ($CO_2$), or on exposure to heat, UV radiation, IR radiation, etc. The settable material can be a powder material composed of fine, medium and coarse construction aggregates, such as sand, crushed stone, gravel, slag, recycled concrete, etc.) that are bound with a hydrolic cement that is capable of setting and hardening by hydration reactions when water is added into it (e.g., Portland cements). The settable materials can also comprise non-hydrolic cement that can be hardened by carbonation reactions with carbon dioxide.

As will be appreciated, the cementitious mixture is capable of in-situ hydration (i.e., hydration in place, on location, on a construction site). In-situ hydration occurs as a liquid, such as water, is topically applied and reacts with a volume of cementitious material within a cementitious composite that is defined by the spacer fabric layer 200 and the settable materials including in the cells. Hydration of cementitious composite mats (e.g., mat or jacket 100) can be initiated in-situ (e.g., in place, on a job site, etc.). The cementitious composite mat may be transported to an install location as a flexible composite material in a prepackaged configuration (e.g., sheets, rolls, etc.) and hydrated on-location as by adding a setting agent, such as water.

Organic Polymers

The settable material can also be a polymer modified cementitious mixture composed of cement mixed with one or more organic polymers that are dispersed or redispersible in water, with or without aggregates, capable of hardening and setting. The organic polymer can be a homopolymer, a copolymer when two or more monomers are copolymerized, or a mixture of two or more polymers (homopolymers and/or copolymers). Several polymers can be used for such application, including but not limited to, synthetic elastomeric latexes (e.g., polyvinyl acetate, polyacrylic esters, styrene-acrylics, vinyl acetate copolymers, polypropylene, polyvinylidene, chloride copolymers, etc.); thermosetting latexes (e.g., asphalt, paraffin, coal-tar, etc.) can be used. The organic polymers used for such application are generally produced by polymerization, mainly emulsion polymerization of the monomers in presence of water, a surfactant, and an initiator that generates free radicals and makes the monomers polymerize. Other components can be used in the polymerization process, such as antifoaming agents (e.g., silicone-based defoamers, or other non-silicone defoamers such as fatty esters or, alcohols, ethylene glycol/propylene glycol based defoamers, etc.), plasticizers (e.g., e.g., phthalates, dibenzoates, polycarboxylates, lignosulphonates, etc.), or other additives can be used to control molecular weight, etc.

Several monomers can be used to form the polymer products described herein including but not limited to styrene, vinyl acetate, acrylate esters (such as n-butyl acrylate, 2-ethyhexyl acrylate, ethyl acrylate, methyl methacrylate, etc.), acrylonitrile, acrylamide, butadiene, vinylidene chloride, vinyl chloride, ethylene, etc.). The purpose of introducing polymers into the settable materials, is to enhance their performance and properties compared to conventional concrete and mortar where for example microcracks can occur more easily under stress.

The organic polymers can be used as a dispersion in water (i.e., latex), a redispersible powder, or a water soluble or redispersible liquid. In some instances, monomers can be added to the cement and can be polymerized in-situ by adding the setting agent (e.g., water). Redispersible polymer powders are mainly used by dry mixing with the cement and aggregate premixes followed by wet mixing with water where the redispersible powders are re-emulsified. This results in hardening of the material to a rigid or semi-rigid solid. In one embodiment, one preferred optimal polymer content is achieved at polymer-to-cement ratios (p/c) between about 5 and about 20 weight (wt.) % but depending on the application and targeted properties, these ratios can go up to about 40 wt. %.

In polymer-modified concrete and mortar, aggregates are bound in a polymer-cement co-matrix where polymer phase and hydrated cement phase interpenetrate resulting in higher performance and superior properties compared to conventional concrete and mortar where microcracks can occur easily under stress mainly due to the fact that calcium silicates hydrates and calcium hydroxide are bound with weaker Van der Waals forces, which leads to poor tensile strength and fracture toughness. In contrast, when organic polymers are added, the organic polymers fill and close the gap and pores, seal the microcracks and therefore prevent their propagation, which leads to higher strength (tensile and flexural) and fraction toughness of the polymer-modified concrete or mortar. The use of organic polymers leads also to the improvement of numerous properties of the concrete and mortar, such as the hardness, barrier properties and permeability, etc. In general, these improvements ten to increase when the polymer content increases, as the porosity tends to decrease when the polymer-to-cement ratio increases.

Other Additives

Other additives can be used with the organic polymer to enhance certain properties, such as thermal and UV resistance, flammability, impact resistance, etc., including but not limited to UV absorbers (e.g., benzotriazole, HALS, etc.); antioxidants (e.g., phenolics, phosphites, etc.); impact modifiers (acrylics, styrenic copolymers, synthetic rubbers, etc.); flame retardants (FRs) (e.g., halogenated FRs, phosphorous FRs, nitrogen-containing FRs, such as melamine, melamine cyanurate, etc. and inorganic FRs, such as aluminum hydroxide magnesium hydroxide, antimony trioxide, etc.). Intumescent flame retardants can also be used by mixing an acid source, such as ammonium polyphosphate, a blowing agent, such as melamine and a carbon source, such as a polyol.

Nanoparticles

Nanoparticles, such as carbon nanotubes (CNT), polyhedral oligomeric silsequioxanes (POSS), nanosilica, organoclay, etc., can also be used as an additive.

The foregoing description of the specific embodiments will so fully reveal the general nature of the invention that others can, by applying knowledge within the skill of the art (including the contents of the references cited herein), readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art.

What is claimed is:

1. A protective fabric jacket for placement on an object to be protected from excessive heat comprising:
    a first layer;
    a second layer;
    an intermediate spacer fabric layer that is disposed between the first layer and the second layer, the first and second layers being attached to the intermediate spacer fabric layer to form a layered structure, the intermediate spacer fabric layer comprising a flexible honeycomb or octagonal shaped spacer fabric that has a plurality of cells defined therein; and
    a settable material that is disposed within the cells and includes a cementitious mixture composed of cement mixed with one or more organic polymers, wherein the settable material is settable to a hardened material,
    wherein a polymer-to-cement ratio (p/c) of the cementitious mixture is between 5 weight (wt.) % and 40 weight (wt.) %, and
    wherein the settable material further comprises at least one additive including an ultraviolet (UV) absorber.

2. The protective fabric jacket of claim 1, wherein the first layer comprises a top layer disposed along an upper surface of the intermediate spacer fabric layer.

3. The protective fabric jacket of claim 1, wherein the second layer comprises a bottom layer disposed along a lower surface of the intermediate spacer fabric layer.

4. The protective fabric jacket of claim 1, wherein the spacer fabric layer is formed of at least one of carbon fibers and aramid fibers.

5. The protective fabric jacket of claim 1, wherein the first layer and the second layer are attached to the spacer fabric layer by stitching.

6. The protective fabric jacket of claim 1, wherein the intermediate spacer fabric layer comprises a flexible octagonal shaped spacer fabric.

7. The protective fabric jacket of claim 1, wherein the cementitious mixture includes construction aggregates that are bound with a hydrolic cement that is capable of setting and hardening by hydration reactions when water is added to the cementitious mixture.

8. The protective fabric jacket of claim 1, wherein the one or more organic polymers comprises a homopolymer, a copolymer formed when two or more monomers are polymerized, or a mixture thereof.

9. The protective fabric jacket of claim 1, wherein the one or more organic polymers comprises synthetic elastomeric latexes.

10. The protective fabric jacket of claim 1, wherein the settable material further includes at least one of an antifoaming agent and a plasticizer.

11. The protective fabric jacket of claim 1, wherein the one or more organic polymers is configured to be added to the cementitious mixture and polymerize in-situ.

12. The protective fabric jacket of claim 1, wherein the settable material further includes nanoparticles.

13. The protective fabric jacket of claim 12, wherein the nanoparticles are selected from the group consisting of: carbon nanotubes (CNT), polyhedral oligomeric silsequioxanes (POSS), nanosilica and organoclay.

14. In combination with a pipe, a protective flexible fabric jacket for placement on an outer surface of the pipe for protecting the pipe from excessive heat, the fabric jacket comprising:
    a first layer;
    a second layer; and
    an intermediate spacer fabric layer that is disposed between the first layer and the second layer, the first and second layers being attached to the intermediate spacer fabric layer to form a layered structure, the intermediate spacer fabric layer comprising a flexible octagonal shaped spacer fabric that has a plurality of cells defined therein; and
    a settable material that is disposed within the cells and includes a cementitious mixture composed of cement mixed with one or more organic polymers, wherein the settable material is settable to a hardened material,
    wherein a polymer-to-cement ratio (p/c) of the cementitious mixture is between 5 weight (wt.) % and 40 weight (wt.) %, and wherein the settable material further includes at least one additive selected from the group consisting of ultraviolet (UV) absorbers and antioxidants.

15. A protective fabric jacket for placement on an object to be protected from excessive heat comprising:
   a first layer;
   a second layer;
   an intermediate spacer fabric layer that is disposed between the first layer and the second layer, the first and second layers being attached to the intermediate spacer fabric layer to form a layered structure, the intermediate spacer fabric layer comprising a flexible honeycomb or octagonal shaped spacer fabric that has a plurality of cells defined therein; and
   a settable material that is disposed within the cells and includes a cementitious mixture composed of cement mixed with one or more organic polymers, wherein the settable material is settable to a hardened material,
   wherein a polymer-to-cement ratio (p/c) of the cementitious mixture is between 5 weight (wt.) % and 40 weight (wt.) %, and
   wherein the settable material further comprises at least one additive including an antioxidant.

16. The protective fabric jacket of claim 15, wherein the one or more organic polymers comprises synthetic elastomeric latexes.

17. The protective fabric jacket of claim 16, wherein the nanoparticles are selected from the group consisting of: carbon nanotubes (CNT), polyhedral oligomeric silsesquioxanes (POSS), nanosilica and organoclay.

18. The protective fabric jacket of claim 15, wherein the settable material further includes at least one of an antifoaming agent and a plasticizer.

19. The protective fabric jacket of claim 15, wherein the one or more organic polymers is configured to be added to the cementitious mixture and polymerize in-situ.

20. The protective fabric jacket of claim 15, wherein the settable material further includes nanoparticles.

* * * * *